Figures 1, 2:
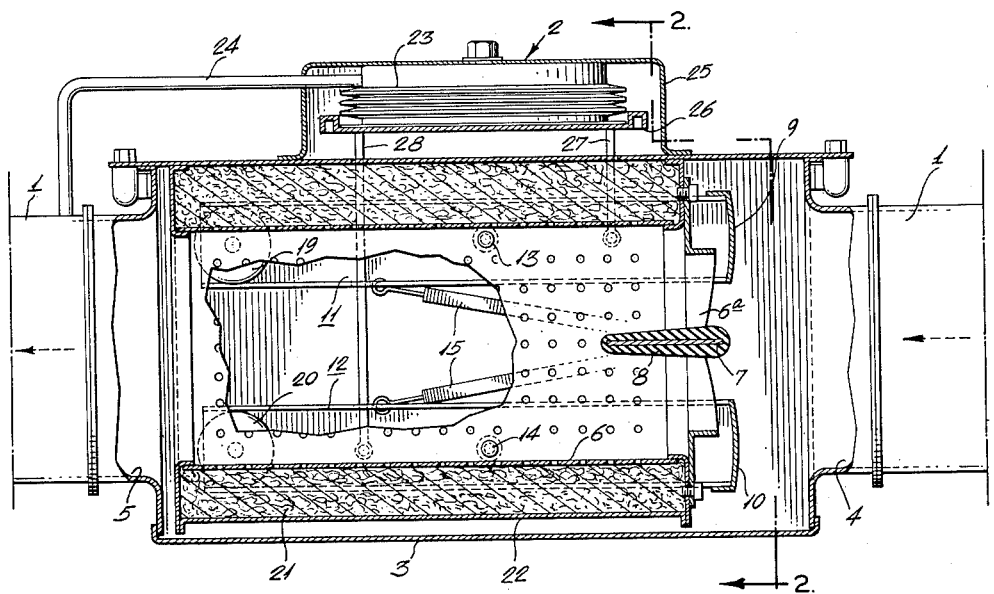

INVENTOR:
SVEN W. WALLIN
BY Howson & Howson
ATTYS.

United States Patent Office 3,139,106
Patented June 30, 1964

3,139,106
PRESSURE REGULATOR
Sven W. Wallin, Jonkoping, Sweden, assignor to Aktiebolaget Svenska Flaktfabriken, Stockholm, Sweden
Filed Feb. 16, 1961, Ser. No. 89,684
Claims priority, application Sweden Feb. 19, 1960
2 Claims. (Cl. 137—375)

The present invention relates to a pressure regulator device for maintaining constant the static pressure in a conduit for a flowing gaseous medium, for instance the supply conduit in a high-pressure air ventilating system, said device comprising a housing provided with an inlet and an outlet serving for connecting the device into the conduit, and a duct portion disposed within the housing between said inlet and outlet and having its unobstructed through-flow area regulated by throttling means in response to a pressure sensing means.

The pressure regulator according to the invention is characterized by a splitter plate inserted in the inlet mouth of the duct portion and adapted to split the fluid flow into two parts, and in that the throttling means is constituted by two arcuate dampers movable towards each other and disposed immediately in front of the inlet mouth of the duct portion, said dampers being, by means of levers, pivoted about axes, respectively, disposed at the centres of the arcuate curve of the respective dampers and extending at right angles to the direction of flow, the dampers being arranged to be moved into engagement with said splitter plate in their closed position.

By the above-disclosed construction of the pressure regulator it has been made possible by simple means to meet and solve the particular problems as regards regulation and noise which are involved in installations for high-pressure ventilation. Thus the subdivision of the fluid flow performed by the inserted splitting plate will cause a rapid restoration of the normal flow characteristic which is disturbed at the point of regulation. This will ensure a lower noise level and will afford increased flexibility in choosing the location for the regulator in the system, in that, without any disadvantage, the regulator may be placed, for example, immediately adjacent a tapping point in the conduit system. Owing to the throttling means being formed as two arcuate dampers movable towards each other, a short regulating distance will result. This will contribute to the possibility of designing the pressure regulator with small outer dimensions adapted to the dimensions of the conduit, and will enable a reduction in the size of the actuating pressure sensing means and a simplification of the transmission of the control forces from the latter to the dampers. Further advantages and features will appear from the sub-claims and the description hereinafter in conjunction with the drawings.

The invention will now be described more in detail with reference to the accompanying drawing illustrating, by way of example, a pressure regulator embodying the invention, and in which:

FIG. 1 is a longitudinal section through the pressure regulator according to the invention; and FIG. 2 is a cross section taken along the line 2—2 in FIG. 1.

In the drawing, numeral 1 designates a pipe conduit for a flowing medium, and numeral 2 designates a device connected into said conduit and serving to maintain constant the static pressure within the conduit. Numeral 3 denotes a housing for the device, and 4 and 5, respectively, denote an inlet and an outlet disposed at opposite ends of the housing. Numeral 6 denotes a duct portion coaxially disposed within the housing and being, in the case illustrated, designed to have a cross-sectional area substantially the same as that of the pipe conduit. Numeral 7 designates a splitter plate inserted in the mouth 6a of said duct portion and being, in the case illustrated, coated with rubber or other sound-absorbing material 8 and formed with rounded upstream and downstream edges. Numerals 9 and 10 denote two arcuate dampers disposed in front of the inlet mouth 6a of the duct portion 6 and movable towards each other and having their edges facing the plate 7 formed as thin edges. The dampers, by means of levers 11 and 12, respectively, disposed exteriorly of the duct portion, are mounted for pivoting about respective axes 13 and 14 which are disposed at the centres of the arcuate curve of the respective dampers. Numeral 15 denotes a tension spring which is mounted between a retainer 16 arranged on the duct portion and the levers of the dampers, respectively. For balancing the dampers, weights 19 and 20, respectively, are mounted on the levers of the dampers. For absorbing noise generated in connection with the throttling operation, the duct portion 6 has perforated walls and is surrounded by a filling 21 consisting of a sound-absorbing material. Numeral 22 designates a casing surrounding and enclosing said filling. Numeral 23 denotes a bellows communicating through a hose 24 with the portion of the pipe conduit 1 downstream of the device 2. The bellows is mounted in a separate chamber 25 disposed within the housing and is arranged to actuate a disc 26 disposed in said chamber; 27 and 28 are two pair of rods which connect the disc 26 with the aforesaid damper levers 11 and 12, respectively.

The operation of the device is apparent from the preceding disclosure. The static pressure downstream of the device acts through the tube 24 upon the bellows 23 which acts through its balanced connections 27, 28 operates the opposite dampers 9, 10 to control the flow of gaseous medium.

What I claim is:

1. A pressure regulator adapted to maintain a constant static pressure in a high pressure air ventilating conduit, comprising in combination, a duct housing connected in said conduit, a duct disposed within said housing, a transverse splitter plate disposed in the inlet end of said duct to divide the air stream into two parts, sound-absorbing material covering said splitter plate and having rounded edges, transverse damper plates mounted on arms on transverse pivots so as to swing in arcs on opposite sides toward and from said splitter plate, said damper plates having narrow edges presented toward said splitter plate, said duct having perforate walls, sound-absorbing material behind said perforate walls, a transversely movable pressure responsive element connected to said arms by links on opposite sides of said pivots and spring arranged to urge said damper plates outward.

2. A pressure regulator adapted to maintain a constant static pressure in a high-pressure air ventilating conduit, comprising in combination, a duct housing connected in said conduit, a duct disposed within said housing, a transverse axially elongated flow dividing splitter plate disposed in the inlet end of said duct to divide the air stream into two parts, throttling means for the air flow in said duct at said splitter plate, said throttling means including a transverse damper plate mounted for transverse movement across the end of said conduit on each side of and in a direction toward and from the longitudinal sides of said splitter plate, said damper plates in the closed position being arranged to engage the axially directed sides of said splitter plate and movable toward and from closed position in a transverse direction to vary the stream passage spaces on each side of the splitter plate, means constantly urging said damper plates toward the open position, and means responsive to the static pressure in the conduit downstream to said damper plates for moving said damper plates toward closed position as the static pressure increases, said means responsive to static pressure including a transversely movable pressure responsive element responsive to static pressure downstream from said duct, splitter plate and damper plates, said damper plates being mounted on arms which are pivoted in said duct at a distance from the point of closing contact of said damper plates with said splitter plate, and links connected between said element and said arms on opposite sides of said arm pivots so as to move said damper plates toward and from said splitter plate from opposite sides when said pressure responsive element moves transversely inward or outward.

References Cited in the file of this patent

UNITED STATES PATENTS

| | | |
|---|---|---|
| 594,727 | Cooper | Nov. 30, 1897 |
| 1,922,512 | Weingartner | Aug. 15, 1933 |
| 1,958,023 | Smith | May 8, 1934 |
| 2,232,981 | Swanson | Feb. 25, 1941 |
| 2,320,007 | Otto | May 25, 1943 |
| 2,357,341 | Miner | Sept. 5, 1944 |
| 2,400,044 | Hermanson | May 7, 1946 |
| 2,598,207 | Bailey et al. | May 27, 1952 |
| 2,660,946 | Peple | Dec. 1, 1953 |
| 2,888,948 | Pellmyr et al. | June 2, 1959 |
| 2,890,716 | Werder | June 16, 1959 |
| 2,974,680 | Kreuttner | Mar. 14, 1961 |
| 2,990,906 | Audette | July 4, 1961 |
| 2,995,078 | Rinquist et al. | Aug. 8, 1961 |